Aug. 22, 1967

H. B. HIGGINS ET AL 3,336,674

CHILD'S GROWTH MEASURING TAPE AND METHOD OF INITIATING
THE WITHDRAWAL OF A MEASURING TAPE

Filed Jan. 7, 1965

INVENTOR.
HOWARD B. HIGGINS
FRED A. GRATOPP
BY HENRY F. RETTING

*Learman, Learman + McCulloch*

ATTORNEYS

*INVENTOR.*
HOWARD B. HIGGINS
FRED A. GRATOPP
BY HENRY F. RETTING

*ATTORNEYS*

United States Patent Office 3,336,674
Patented Aug. 22, 1967

3,336,674
CHILD'S GROWTH MEASURING TAPE AND METHOD OF INITIATING THE WITHDRAWAL OF A MEASURING TAPE
Howard B. Higgins, Birmingham, and Henry F. Retting and Fred A. Gratopp, Saginaw, Mich., assignors to Lufkin Rule Company, Saginaw, Mich., a corporation of Michigan
Filed Jan. 7, 1965, Ser. No. 423,963
6 Claims. (Cl. 33—138)

This invention relates to measuring tapes and more particularly to a measuring tape construction which is particularly suited to progressively measuring and recording the growth of a child.

One of the prime objects of the invention is to provide a measuring tape construction which may be very readily used to accurately measure the height of a child, and on which the measurement and date of measurement may be recorded so that the measurement may be compared with another measurement taken at a later date to observe the growth rate of the child.

A further object of the invention is to provide a measuring tape construction of an individual and personalized nature having provision for carrying a photograph of the child in a convenient and readily accessible manner.

Another object of the invention is to provide a measuring tape construction of the character described having an elongated holding tab which permits the withdrawal of the tape to be accomplished in a new and improved manner.

Other objects and advantages of the invention will be pointed out specifically or will become apparent from the following description when it is considered in conjunction with the appended claims and the accompanying drawings, in which:

Figure 1:
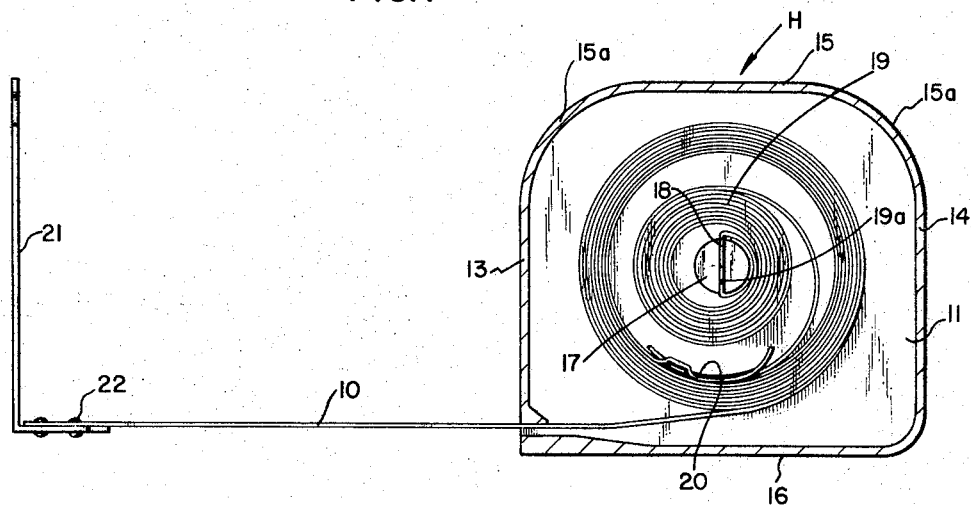
FIGURE 1 is a sectional side elevational view of the measuring tape, the tape being shown as partly withdrawn from its housing.
Figure 4:
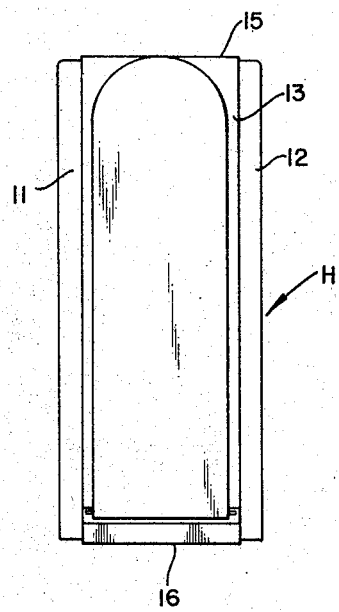
FIGURE 4 is an end elevational view of the measuring tape construction.

Referring now more particularly to the drawings, a letter H generally indicates the housing or casing for the measuring tape 10, which may be constructed of a suitable material such as plastic. The housing preferably includes side walls 11 and 12, which may be adhesively secured to end walls 13 and 14 and top and bottom walls 15 and 16. It will be observed that the top wall 15 includes curvilinear portions 15a which merge with the end walls 13 and 14, as shown particularly in FIGURES 1 and 2.

Mounted on the side wall 11 is the usual center post 17 having the slot 18 for receiving the inner end 19a of a wind-up spring 19 which may be connected as at 20 to the inner end of the measuring tape 10 in any suitable manner. The wind-up spring 19 normally tends to pull the measuring tape 10 into the casing so that the elongated, upwardly extending blade or retaining tab 21, which may be secured to the leading end of the tape 10 by rivets 22, is pulled inwardly to the position against side wall 13 in which it is shown in broken lines in FIGURE 2.

Figure 2:
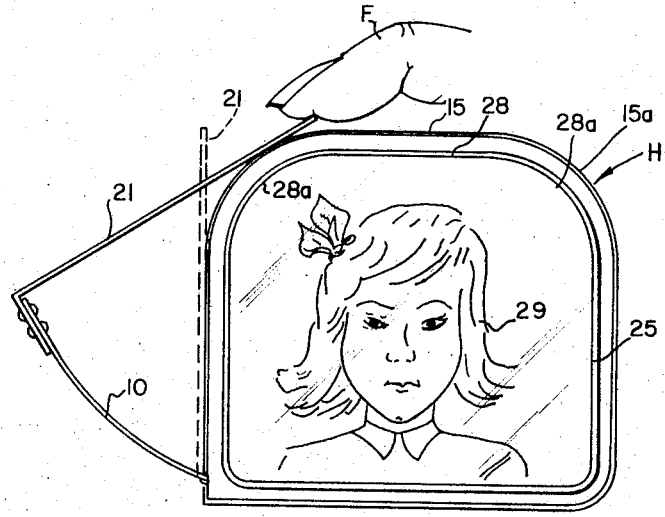
FIGURE 2 is a side elevational view of the measuring tape, with the tape retaining tab or blade being shown in pivoted position to initiate withdrawal of the tape from the housing, the broken lines indicating the position of the holding tab when the tape is completely withdrawn within the housing.
Figure 3:
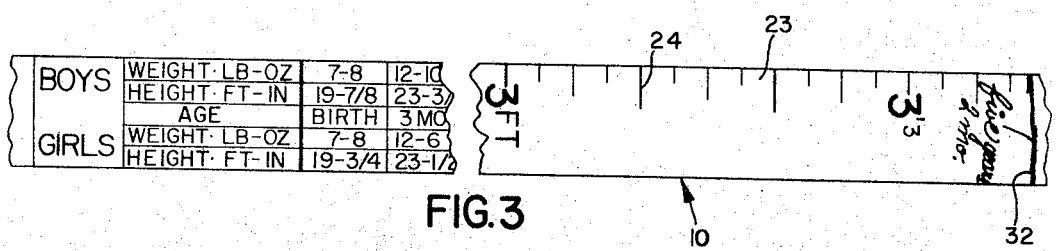
FIGURE 3 is a fragmentary top plan view of portions of the measuring tape only.

The tape 10 preferably is formed of metal which is coated with a suitable paint on both sides to provide a background portion 23 on which growth measuring indicia 24 are provided. Usually a white pigment paint is used on which an ordinary ball-point pen will write, and the indicia 24 and accompanying numerals are printed on in a dark, contrasting color, such as black. Also provided on the tape 10, as indicated in FIGURE 3, are statistics indicating typical heights for various ages and weights which reflect average weights and heights for children of various ages. As shown in FIGURE 2, the retaining tab or blade 21 projects upwardly beyond the side wall portion 13 so that the finger F of a person using the tape may initiate withdrawal of the tape in the manner indicated in FIGURE 2.

Figure 6:
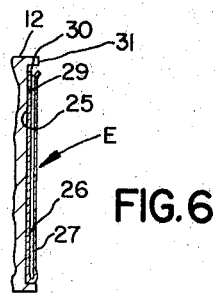
FIGURE 6 is a fragmentary, transverse sectional view particularly illustrating the transparent envelope which is received within at least one of the side walls of the measuring tape housing.
Figure 7:
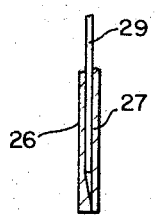
FIGURE 7 is a sectional, end elevational view thereof on an enlarged scale.

As shown in FIGURE 6, at least one side wall 12 of the tape housing H is recessed as at 25 and receives a transparent envelope generally indicated E which is comprised of two similarly shaped sheets of transparent plastic material 26 and 27 which are adhesively joined together at their side and bottom edges. The top edge 28 of the envelope, including the curvilinear portions 28a, is open to receive the photograph 29 of the child. Each of the side walls 11 and 12 of the tape housing H may be and preferably is recessed as at 25 to receive a transparent envelope E, and it is to be understood that an adhesive may be applied to the recessed faces of the side walls 11 and 12 to secure the envelopes firmly in position. As shown in FIGURE 6, the free upper edge 28 of the transparent envelope is spaced as at 30 from the upper marginal wall 31 of the recessed portion 25 of the side wall 12 so that the photograph 29 may be inserted with ease, and the wall 31 overlies the photograph so that the photograph will be retained within the envelope.

Figure 5A:
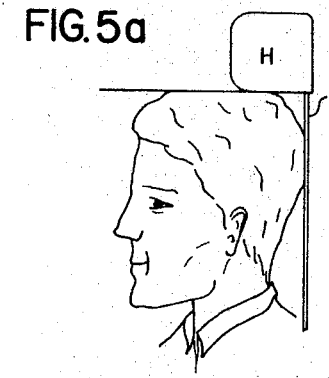
FIGURES 5a and 5b are side elevational views indicating the manner in which the tape is used to measure height.
Figure 5B:
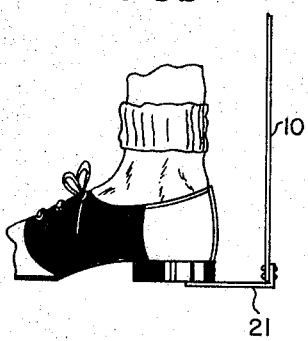

A measuring tape of the character described is purchased for each child in the family and his or her photograph is inserted in the transparent envelope E provided on the side wall 12. To use the growth tape, the parent presses the upper end of retaining tab 21 with a forefinger, as shown in FIGURE 2, to initiate withdrawal of the tape 10 from the housing H, and then grips the bottom end of tab 21 with the other hand and pulls the tape 10 from the measuring tape casing or housing H. With the heel of the child placed on the blade or tab 21, as shown in FIGURE 5b, the casing H is then pulled upwardly until it rests on the head of the child, as shown in FIGURE 5a. As previously noted, a ball-point pen is then used to mark the height on the tape, as at 32 in FIGURE 3.

It will be apparent that the measuring tape will serve as a record and highly prized family memento.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

We claim:
1. A child's growth measuring tape construction comprising: housing means with side walls, end walls, and top and bottom walls; one end wall being flat and having a transversely extending tape opening near the bottom thereof; a measuring tape normally coiled within said housing and withdrawable out said opening; a retaining tab secured to the leading end of said tape and extending upwardly beyond said one end wall to provide an accessible upper end which may be pressed to initiate the withdrawal of the tape; height indicating indicia in longitudinally spaced relation along said tape; the housing means having at least one side wall with a recessed portion; and envelope means, open along one side edge to receive a photograph of a child, adhesively secured in the recessed portion of the side wall with the open side edge being spaced from a marginal wall of the recessed portion of the side wall to permit insertion of the photograph.

2. The combination defined in claim 1 in which said tape is provided with a surface finish which may be written upon.

3. The combination defined in claim 1 in which said envelope means comprises a pair of generally rectangular, transparent, plastic sheets secured together along all side edges except their top side edge.

4. The combination defined in claim 3 in which the depth of the recessed portion in the one side wall is greater than the combined thickness of the pair of plastic sheets.

5. A method of initiating the withdrawal of a measuring tape from a measuring tape housing in which is is coiled and wherein the leading end of the tape has a tab thereon with an inner end attached to the tape and an outer end extending beyond the adjacent side wall and corner of the housing comprising: camming the tab on said corner of said housing by pressing the extending outer terminal end toward the housing and pivoting the tab on said corner thereby drawing the leading end of the tape outwardly.

6. A child's growth measuring tape construction comprising: housing means with side wall portions and an edge wall comprising, end wall portions, and top and bottom wall portions; one end wall portion being generally flat and having a transversely extending tape opening; measuring tape means normally coiled within said housing and withdrawable out said opening; an elongate tab secured to said tape means and extending upwardly along said one end wall portion beyond said one end wall portion to provide an accessible upper end which may be pressed to initiate the withdrawal of the tape; height indicating indicia in longitudinally spaced relation along said tape; at least one side wall portion having a recessed portion; and transparent envelope means, open along one side edge to receive a photograph of a child, secured in the recessed portion of the side wall with the open side edge being spaced from a marginal wall of the recessed side wall to permit insertion of the photograph.

References Cited

UNITED STATES PATENTS

| | | | |
|---|---|---|---|
| 642,727 | 2/1900 | Smith | 242—84.8 |
| 1,424,085 | 7/1922 | Crogan | 33—138 |
| 1,612,637 | 12/1926 | Mesterton | 33—137 |
| 1,926,581 | 9/1933 | Clarke | 33—138 |
| 1,974,085 | 9/1934 | Shields | 33—137 |
| 2,197,031 | 4/1940 | Davis | 33—137 |
| 2,680,576 | 6/1954 | Nykwest | 242—84.8 |
| 3,144,717 | 8/1964 | Gumaelius | 33—138 |

FOREIGN PATENTS 10,418   10/1885   Great Britain.

LEONARD FORMAN, *Primary Examiner.*

B. A. DONAHUE, J. M. FREED, *Assistant Examiners.*